United States Patent [19]
Behnken
[11] 4,140,349
[45] Feb. 20, 1979

[54] MOBILE MIXING APPARATUS

[76] Inventor: Joseph R. Behnken, Rte. 13, New Athens, Ill. 62264

[21] Appl. No.: 772,664

[22] Filed: Feb. 28, 1977

[51] Int. Cl.$^2$ .................... B65G 53/04; B65G 53/30

[52] U.S. Cl. .................................. 302/14; 222/135; 222/626; 239/127; 239/172; 302/20; 366/11

[58] Field of Search .................. 222/23, 40, 145, 148, 222/193, 318, 627, 132, 133, 626, 628, 735; 239/127, 172; 302/20, 35, 52, 53, 14; 417/440; 366/10, 11

[56] References Cited

U.S. PATENT DOCUMENTS

| | | | |
|---|---|---|---|
| 2,810,606 | 10/1957 | Taylor | 239/127 X |
| 3,251,508 | 5/1966 | Borys | 222/145 X |
| 3,255,771 | 6/1966 | MacSpadden | 222/23 X |
| 3,333,774 | 8/1967 | Demaison | 222/145 X |
| 3,456,848 | 7/1969 | Shaffer et al. | 222/318 X |
| 3,580,420 | 5/1971 | Kennedy et al. | 222/148 X |
| 3,712,681 | 1/1973 | Marino et al. | 302/20 |

*Primary Examiner*—Allen N. Knowles
*Assistant Examiner*—Fred A. Silverberg
*Attorney, Agent, or Firm*—Cohn, Powell & Hind

[57] ABSTRACT

This mobile mixing apparatus utilizes a conventional pneumatic tractor trailer suitable for transporting and discharging granular bulk material which is modified to discharge and mix a liquid material with the granular material. The modification includes a partition creating a separate liquid compartment in the vehicle tank and a liquid discharge line connected between the liquid chamber and the pneumatic discharge line and having a flow control assembly. The flow control assembly includes a pumping and metering system for discharging an accurately measured quantity of liquid into the pneumatic discharge line for mixing with the granular material prior to discharge.

4 Claims, 2 Drawing Figures

MOBILE MIXING APPARATUS

BACKGROUND OF THE INVENTION

This invention relates generally to a mixing apparatus for on-site mixing of bulk granular material and liquid and particularly to utilizing a modified pneumatic trailer to accomplish such mixing.

The mixing of two or more materials carried by a tank truck is not in itself new and various specialized equipment is known by which such materials are mixed at a site. Site mixing is necessary when the two materials are to be batched to specific requirements and when the quantities batched are to be varied to suit particular conditions. An example of such batching equipment is to be found in the U.S. Pat. No. 3,491,949 which discloses a tank truck used for batching dry fertilizer and liquid. This patent discloses a pump by-pass system but the mixing is accomplished by using liquid pressure rather than a combination of liquid and pneumatic pressure. Another situation in which site mixing is necessary is when the two materials to be mixed are carried in separate containers because of their incompatibility. An example of this is to be found where epoxy painting materials are to be mixed as disclosed in U.S. Pat. No. 3,245,329. The present mixing apparatus accomplishes on-site mixing in a manner neither disclosed not suggested by the known prior art.

SUMMARY OF THE INVENTION

The mobile mixing apparatus provides means by which a pneumatic trailer may be modified to mix liquid and bulk granular materials without preventing use of the trailer for its customary function of delivering a dry bulk commodity only when the mixing apparatus is not being used.

This mobile mixing apparatus provides a tank mounted onto a vehicle and including a first compartment for granular materials and a second compartment partitioned from the first compartment for liquid. A first pneumatic discharge conduit is connected to the granular material compartment for discharge of said granular material and a second, hydraulic discharge conduit is connected between the liquid compartment and the first discharge conduit and flow control means is provided in the second conduit to selectively determine the quantitative admixture of liquid into the granular material.

The flow control means of this mixing apparatus includes a pump having an inlet port connected to a suction section of the liquid discharge conduit and an outlet port connected to a pressure section of the liquid discharge conduit. A by-pass conduit is connected between the suction section and the pressure section which includes a regulator valve to regulate flow through the by-pass conduit.

The flow control means also includes a regulator valve in the pressure section of the liquid discharge conduit and visual metering means for monitoring flow through said second regulator valve.

The flow control means also includes a one-way check valve in the pressure section of the liquid discharge conduit between the metering means and the junction of the liquid discharge conduit and the pneumatic discharge conduit to preclude backflow of the granular material into the liquid discharge conduit thereby to avoid contamination of other granular material when the mixing apparatus is not being used.

This invention provides a method of on-site mixing of liquid and granular materials comprising the steps of partitioning the tank of a pneumatic trailer to provide a sealed liquid compartment; filling the non-liquid compartment with a granular material at a first station; transporting the trailer to a second station; filling the liquid compartment with liquid at said second station; pneumatically discharging granular material from the trailer through the trailer discharge conduit and pumping liquid material from the liquid compartment into the discharge conduit of the granular material at a controlled rate.

DESCRIPTION OF THE PREFERRED EMBODIMENT

Figure 1:
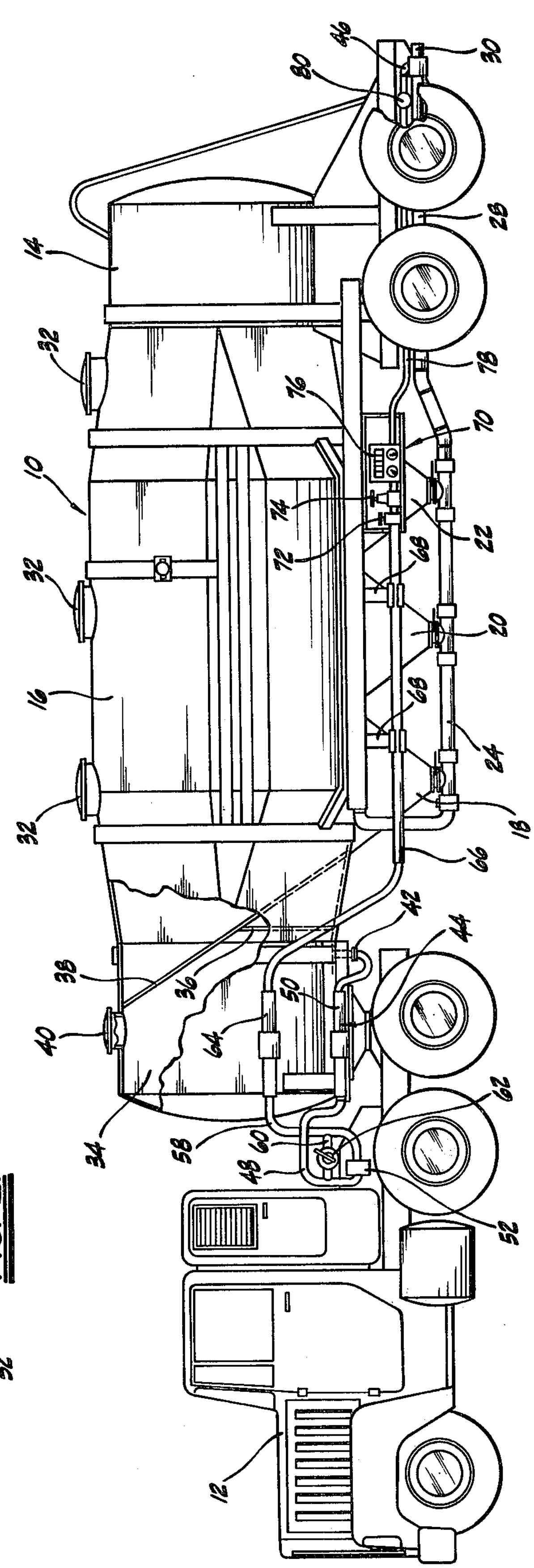
FIG. 1 is a side elevational view of a modified pneumatic trailer incorporating additional hydraulic components to provide a mobile mixing apparatus.

Referring now by reference numerals to the drawing and first to FIG. 1, it will be understood that the mobile mixing apparatus is provided by a modified pneumatic tractor trailer generally indicated by numeral 10. The tractor trailer is conventional in that it includes a tractor portion 12 having a tank trailer 14 mounted thereto. The tank trailer 14 includes a compartment 16 constituting a first compartment means adapted to contain bulk granular material, such as ammonium nitrate, and provided with hopper portions 18, 20 and 22 connected to a pneumatic discharge line generally indicated by numeral 24 and constituting a first discharge conduit means, said discharge means having a source (not shown). The discharge line 24 includes an extension portion 28 supported by hangers or other means (not shown) from the trailer body and terminating in a discharge port 30. It will be understood that the tank compartment 16 includes covered openings 32 by which the compartment 16 is filled with the granular material.

The tank trailer 14 is partitioned into a second compartment indicated by numeral 34, which constitutes a second compartment means, adapted to contain a liquid, such as fuel oil, by plate 36, which cooperates with the existing tank interior plating 38 to form a compartment which is sealed from the compartment 16 and is filled from a covered opening 40. Importantly, the liquid compartment 34 is provided with a discharge port 42 to which is coupled hydraulic discharge line constituting a second discharge conduit means which is connected in communicating relation between the second compartment and the first discharge line near the discharge port 30 of said first discharge line at a junction indicated by numeral 46. The discharge line 44 together with the flow control means which selectively determines flow through said line will now be described.

Figure 2:
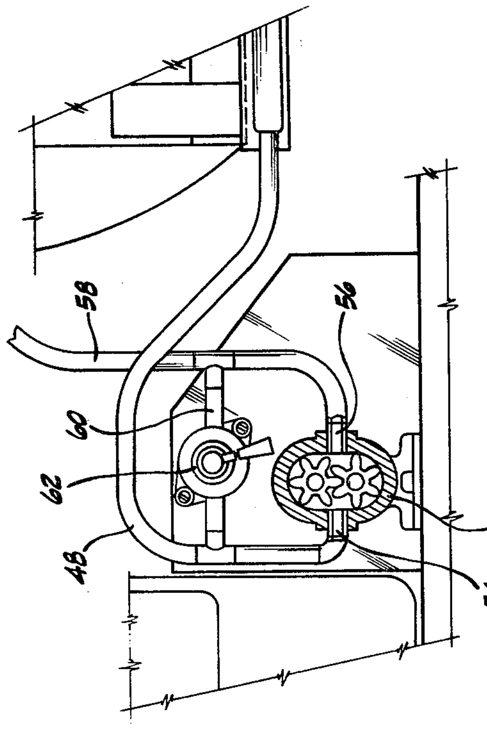
FIG. 2 is an enlarged fragmentary view, partly in cross section, illustrating the pump and by-pass assembly of the flow control system.

The hydraulic discharge line 44 includes a suction section 48 formed from flexible line attached to the trailer as by a support 50 and connected to a high pressure pump 52, see FIG. 2, at the inlet port 54 of said pump. The discharge line 44 also includes a pressure section 58, flexible in part, which is connected to the outlet port 56 of said pump 52. Importantly, a by-pass line 60, constituting a by-pass conduit means, is provided between the suction section 48 and the pressure section 58, said by-pass line including a regulator valve 62. The high pressure pump 52 receives its power from the power take off (not shown) of the engine of the tractor 12 and the delivery of liquid from the compartment 34 into the pressure section 58 is determined by the pump 52 and the position of the regulator valve 62. The pressure section 58 is attached to the trailer 14 by means of a support 64 and includes a rigid portion 66 which is supported from the trailer as by hangers 68 and connects to a second portion of the flow control means generally indicated by numeral 70. The second portion of the flow control means includes a shut-off valve 72, a regulator valve 74 and a meter 76 and provides a means of visually monitoring flow through the hydraulic discharge line. The final section of the pressure line 58 is indicated by numeral 78 and includes a check valve 80 disposed between the meter and the junction point 46 which prevents back pressure from the pneumatic line 24 into the liquid discharge line when mixing is not required.

It is thought that the structural arrangement of the components of this mobile mixing apparatus have become fully apparent from the foregoing description of parts but for completeness of disclosure, the operation of the apparatus will be briefly described with particular reference to the mixing of ammonium nitrate and fuel oil.

The compartment 16 of the trailer tank 14 is loaded with bulk ammonium nitrate at a first loading station and the tractor trailer is then driven to a second loading station, such as a coal mine. At the second loading station the liquid compartment 34 is filled with fuel oil. The tractor trailer carrying the fuel oil and ammonium nitrate is then driven to the mine storage bins located at the mine.

Unloading of the ammonium nitrate from the discharge line 24 is commenced in the conventional manner by applying pressure to the pneumatic discharge line. The fuel oil is delivered from the outlet 42 of the fuel oil compartment 34 to the discharge line 44 by means of the high pressure pump 52 which draws the oil from said outlet by way of the suction line 48 through the pump and into the pressure line 58. The regulator valve 62 in the by-pass line 60 is set to insure that the correct quantity of fuel oil is delivered to the pressure line 58. It will be understood that the high pressure pump 52 performs at full pressure when the regulator valve 62 is closed and that by partially opening this valve the fuel oil is circulated counterclockwise from the pressure line 58, through the by-pass line 60 and the regulator 62 back to the suction line 48. This decreases the oil pressure with the result that a smaller quantity of oil is pumped through the remaining portion of the fuel oil discharge line 44 beyond the junction of the by-pass line 60. From this point the oil is pumped through portion 66 of the pressure line 58 to the shut-off valve 72, and passes through said shut-off valve which is open. The oil then passes through the adjustable regulator valve 74, which provides an accurate measure of the amount of oil that is to be mixed with the ammonium nitrate to insure that it is in the exact proportion to produce the desired end product. The fuel then passes through the meter 76 which provides a visual indication to the operator that the regulator valve 74 is regulating the correct quantity of oil. From the meter 76 the oil travels by way of line 78 to the junction point 46 and passes into the ammonium nitrate discharge line 24 where it is admixed with the ammonium nitrate resulting in the desired combination end product which is delivered to ambience from the discharge port 30. The check valve 80 in line 78 serves to insure that there is no back up of material into said line when the tank is being used for other dry bulk commodities and avoids the problems of contamination which would otherwise occur.

I claim as my invention:

1. Mobile mixing apparatus comprising:

(a) a modified pneumatic tank trailer vehicle including a first compartment means for granular material occupying a substantial portion of the tank, (b) the modification including liquid-tight partition means within the tank separating at least part of the remaining portion of the tank into a second compartment means disposed in sealed relation from the first compartment means for liquid, (c) pneumatic discharge conduit means connected to the first compartment means to receive granular material from said first compartment means, said pneumatic conduit means including a discharge port disposed ahead of said first compartment means for discharge of said granular material therethrough, (d) hydraulic discharge conduit means connected in communicating relation between the second compartment means and the pneumatic conduit means, said hydraulic conduit means being connected to said pneumatic conduit means between said first compartment means and said discharge port to mix with said granular material prior to discharge thereof, and (e) flow control means in the hydraulic conduit means selectively determining the admixture of liquid into the granular material in the pneumatic discharge conduit means.

2. An apparatus as defined in claim 1, in which:

(f) the hydraulic discharge conduit means includes a suction section connected to the second compartment means and a pressure section connected to the pneumatic discharge conduit means, and (g) the flow control means includes:

(1) pump means having an inlet port connected to the suction section of the hydraulic discharge conduit means and an outlet port connected to the pressure section of the hydraulic discharge conduit means, (2) by-pass conduit means connected between said suction section and said pressure section, and (3) first regulator valve means regulating flow through the by-pass conduit means.

3. An apparatus as defined in claim 2, in which:

(h) the flow control means includes second regulator valve means in the pressure section of the hydraulic discharge conduit means and visual metering means between the second regulator valve means and the pneumatic discharge conduit means.

4. An apparatus as defined in claim 3, in which:

(i) flow control means includes one-way check valve means in the pressure section of the hydraulic discharge conduit means between the metering means and the pneumatic discharge conduit means to preclude backflow of the granular material from the pneumatic discharge conduit means into the hydraulic discharge conduit means.

* * * * *